July 17, 1934.  A. H. WARTH  1,967,195
METHOD OF MANUFACTURING BOTTLE CAPS
Original Filed Nov. 7, 1930  2 Sheets-Sheet 1
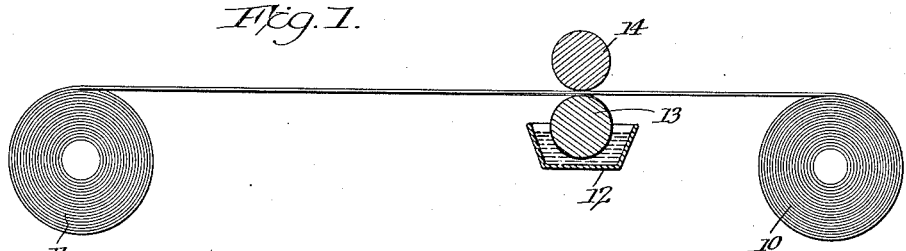
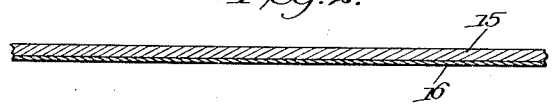
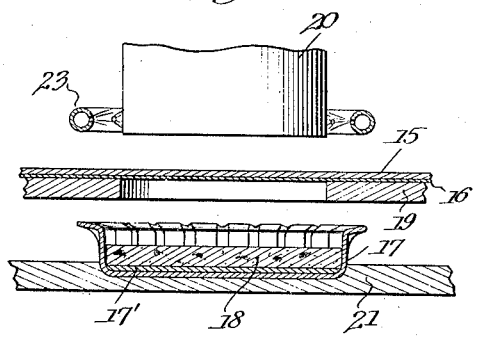
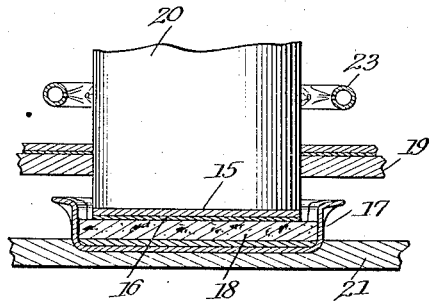
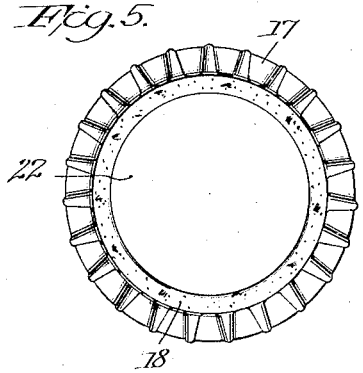
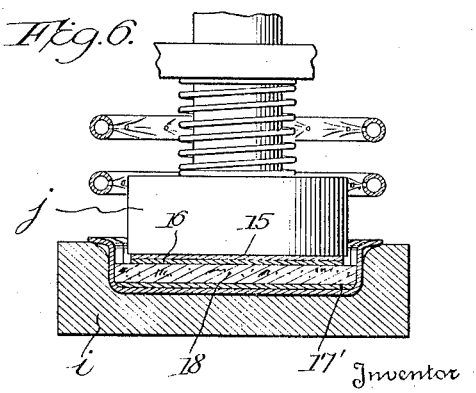
Inventor
Albin H. Warth.
By Cushman Darby & Cushman
Attorneys Patented July 17, 1934

1,967,195

UNITED STATES PATENT OFFICE 1,967,195

METHOD OF MANUFACTURING BOTTLE CAPS

Albin H. Warth, Baltimore, Md., assignor to Crown Cork & Seal Company, Inc., Baltimore, Md., a corporation of New York Original application November 7, 1930, Serial No. 494,201, which in turn is a division of Serial No. 159,743, January 7, 1927, now Patent No. 1,788,260, dated January 6, 1931. Divided and this application April 4, 1933, Serial No. 664,410

3 Claims. (Cl. 113—80)

This invention relates to a method of producing closures of the type in which a sealing disk has a facing. This type of closure is characterized by the provision, upon the interior cushion or sealing disc, of a facing or spot having a surface which protects the cushion material from the liquids and gases.

This application is a division of my copending application, Serial No. 494,201, filed November 7, 1930, and the latter is a division of my application, Serial No. 159,743, filed January 7, 1927, now Patent No. 1,788,260, granted January 6, 1931.

Closures of the well known crown cork type comprise a metal shell having a skirt and a resilient sealing disk or pad usually made of cork. For some uses, the sealing disks or pads are given a facing, e. g., tin foil, or aluminum foil, these materials or other materials of protective character being suitable to provide a non-absorbent, gas impervious, and acid resistant facing. Ordinarily this facing is of smaller diameter than the cork disks and such crowns are known in the trade as "center spot crowns".

A commercially practicable method for manufacturing center spot crowns must ensure a high speed of production and accurate positioning of the center spot. An object of the present invention is to provide a method which will permit production at the rate of from 400 to 600 per minute, i. e., application of the center spots to the sealing pads at such a rate. A further object is to ensure accurate positioning or centering of the facing or spot while maintaining this high speed.

These center spot crowns have been produced in various ways. According to one method a slot or groove is cut in the cork disk and the spot is given an inturned rim which is inserted in the slot. This method is objectionable because of its expense and because the tin foil spots are apt to drop out. According to another method the spots are pasted to the cork disks by a casein paste or a glue. In crowns so made the spots tend to loosen as the paste or glue is attacked by the packaged liquids. Furthermore, such method involves difficulties in handling and in applying the paste or glue. According to still another method, the spots are secured by an underlying and separately formed and deposited tissue of gutta percha or coated paper. In crowns so made, like objections are met with. For example, one difficulty in applying disks made from separate strips, such as gas and acid resistant material and the adhesive tissue strips, has arisen from the necessity for feeding the two strips to the punching and assembly machine. There is not only difficulty in feeding the strips, but in cutting the separate tissue strip with a clean, sharp edge so as to insure the binding stratum of adhesive being coextensive in area with the disc of liquid resistant material. As will be understood, the adhesive stratum is intended to act not only as a cement, but also as a water-proof, non-absorbent, gas impervious medium for avoiding the possibility of the contents of a bottle getting between the facing disk and the material of the cap, either the metal shelf itself or a cushion disk of cork or composition cork.

Furthermore, when using superimposed strips of the facing material and of adhesive tissue, it was essential, to bond the adhesive tissue to both the material of the cushion disc in the cap and the facing material.

In preparing the rolls of facing material and adhesive tissue, the practice usually followed was to form a roll of the tissue in strips of the desired width, and to unwind this roll and a roll of the facing material while feeding the two strips one over the other into the disk forming and assembling machine. This is a troublesome and expensive operation, because of the frequent breakage of the adhesive tissue and the necessity for using fairly heavy tissue to minimize this tendency. This is due partly to the fact that the facing material was substantially non-elastic, while the adhesive tissue possessed a certain degree of elasticity, thus introducing a factor of difficulty in securing a uniform paying of both the facing strip and the gutta percha tissue strip.

It is desirable, in the use of facing disks of the character above referred to, that the adhesive stratum be as thin as possible, and yet be continuous throughout the entire area of the facing disk, and particularly that it be uninterrupted about the edge of this disk, since at this point the disk should be firmly bonded so as to effectively seal the joint above the edge of the facing disk. When cutting and applying the disk of material and adhesive, there is no means of ascertaining whether the desired conditions are present in the completed cap. Consequently, there is always likelihood of imperfectly faced caps being produced.

With the above conditions in mind, I have provided material, in strip form, for facing bottle caps, in which one surface of the strip is provided with a firmly adherent, continuous thin facing of adhesive, thus avoiding all necessity for assembling strips of facing material and of adhesive tissue preparatory to their use in the bottle cap facing machine, and all of the disadvantages growing out of this practice.

In the strip material of my invention, a very thin stratum of adhesive is evenly distributed upon one face of a strip of facing material. The adhesive is not only firmly bonded to this material, but has a smooth surface finish of sufficient thickness to form the desired firm bond between a disk cut from the strip and the material of the cap to which such disk is cemented.

Furthermore, adhesive tissue must be of a thickness to have sufficient inherent strength to permit of its being stripped from a roll in a mill for working same, and to admit of its being cut to the desired width and to be handled in the winding and the disk applying machines, and during the process of its production it has more or less of a longitudinally extending grain, as distinguished from its normal granular formation.

In the application of heat, when bonding the facing material to the cap, when utilizing adhesive tissue, a tendency of the adhesive is to break up into slightly isolated, small globules, thus interrupting the continuity of the bonding stratum. Whether this is due to irregularities in the surface of the facing strip, or to a shrinkage of the adhesive tissue when fused, I have been unable to determine. In the strip of my invention, however, the adhesive is thoroughly distributed throughout one face of the facing material, and the above conditions do not develop in the subsequent handling of the strips.

It is an object of the present invention to provide a method of producing spot center crowns such that the spots may be rapidly and economically secured to the sealing disks and such that they are firmly secured and not liable to become loosened in use.

Another object of the invention is to provide a method in which the sealing discs or "spots" when punched from the strip and delivered to the cushion pad will be stuck in position instantly or as soon as deposited whereby during subsequent operations they will not move from the accurately centered position in which they are placed by the punch and die mechanism. This is preferably accomplished by preheating the sealing pad or cushion sufficiently to cause the thermoplastic coating on the disc to fuse sufficiently when it engages the pad to adhere instantly to the sealing pad.

With these general objects in view, the invention consists in the method which will be first described and then more particularly pointed out in the claims.

According to the method of the present invention, the strip material, such as metal foil, is coated with a substance that is devoid of tackiness when dry and has adhesive qualities when soft. In carrying out the method according to what is considered the best practice, the adhesive substance is such that it can be applied cold, i. e., at room temperatures, and is insoluble in cold water. While various materials may be used, I have found a suitable adhesive in a solution of dammar resin and rosin in mineral spirit or turpentine, to which is added 5% or less of a vegetable oil, such as soya bean or China-wood oil. The dammar gum and rosin may be in the proportion of 35% to the whole. The adhesive may have a drier of lead resinate or the like in a proportion of 2% or less. Another example of a suitable gum type of adhesive is gutta percha or a gutta percha containing compound which have characteristics similar to the composition previously described. Among such characteristics are substantially non-tackiness or adherence at room temperature a high degree of flexibility, insolubility in and imperviousness to moisture or water, acid resistance and heat fusibility, i. e., adapted to be brought to a tacky state by the mere application of heat and without the use of moisture. Such an adhesive is specified in my copending application, Serial No. 414,614, filed December 17, 1929, now Patent No. 1,899,782, granted February 28, 1933.

An adhesive of this character provides a highly flexible adhesive layer continuously united with the facing material. Moreover, such an adhesive is highly resistant to the acids and alkalies ordinarily present in liquids which are to be capped. This is highly important in the manufacture of spot caps, since the liquids attack the adhesive around the edge of the spot. An adhesive of this character, which is not only waterproof, but resistant to acids and alkalies as well, maintains a firm adherent union of the facing or spot material with the cork disk. Due to its flexible character, it will not crack, and, therefore, it constitutes a flexible backing for the spot material.

While the coating may be applied to the material in various ways, it is conveniently applied in fluid or plastic form to a strip of foil from which the spots are to be cut. So far as the method of producing the strip is concerned, it is such that the effective distribution of the adhesive throughout the entire area of the facing material is assured, and this condition cannot be disturbed as a result of the cutting of disks from this material when in strip form. Furthermore, the adhesive surface may be thoroughly inspected while producing the strip material, so that any imperfect product may be discarded before it reaches the disk applying machine. In this connection it is noted that the spots may be conveniently assembled by feeding a strip of material over successive crown corks and cutting out a disk which is deposited on a cork, such assembling machinery being known in the art.

After the coating is applied to the material, it is dried. While this may be effected by air drying at room temperatures, it is more rapidly accomplished at a temperature of about 300° F. maintained for about three minutes. When dried the coating is devoid of tackiness so that the metal foil may be handled without difficulty or trouble. This is particularly advantageous when the metal foil is to be fed in strips because the application of the adhesive is carried out independently of the assembling steps. Moreover, the coating gives the thin metal foil more or less body, which facilitates feeding and cutting.

Since the adhesive is applied directly to the surface of the facing or spot material and firmly bonded thereto, there is no likelihood of difficulties arising as a result of separation of the adhesive from the facing strip during the spot forming operation, either as a result of poor adherence or from suction or otherwise, such as frequently occurs when using superimposed strips of facing material and of adhesive tissue. Moreover, in handling this material the adhesive stratum is incapable of stretch or distortion relative to the spot strip as frequently occurs in the handling of separate strip of adhesive tissue and facing material where any stretch or distortion of the adhesive stratum results in a defective cap and when the stretch is extreme, tearing of the adhesive tissue makes necessary the stoppage of the cap machine until the strip can be repaired.

After the coating is dry, the metal foil spots are assembled, coated side down, with the sealing disks. In case the metal foil is fed in a strip, spots may be cut out and deposited on the sealing disk, as above set forth.

At the time of assembly the coating material is softened by heat to render it adhesive and the assembled unit is subjected to pressure. In carrying out the invention according to what is now considered the best practice, the coating will be softened by heat after the spot is applied. This may be accomplished in any suitable manner, for example by a heated plunger or a plunger and heated table such as illustrated in Figure 6 of the accompanying drawings. The heat softens the coating and renders it adhesive and the pressure serves to unite the spot to the cork. I also prefer to preheat the cushion disc or pad in the metal shell so that, as soon as the spot is applied, the thermoplastic adhesive thereon will be fused or softened and thereby cause the spot to be fixed in the accurately centered position in which it is deposited and held against dislodgment during the subsequent steps and passage through the apparatus. In cutting disks from this improved laminated strip having an adhesive stratum bonded thereto, there is no tendency toward mutilation of the adhesive layer by reason of possible drag of the cutting dies, and each disc, as delivered from the die to within a cap, will present a continuous uninterrupted adhesive surface upon the disk so as to insure, by the subsequent application of heat and pressure, a bond between the disk and the cap cushion layer coextensive in area with the disk.

This possibility of securing a clean cut by the dies for forming the disks, both as to the non-absorptive and gas impervious, and as to the adhesive stratum, insures an effective bond entirely about the edge of the spot or disc, thereby presenting a continuous barrier of non-absorptive and gas impervious material at the space between the disk and the cap which will effectively prevent the seepage of gas or fluid in a bottle between the disk and the portion of the cap to which it is applied.

Referring to the accompanying drawings, there is shown suitable mechanism for coating the strip and for cutting disks therefrom and adhesively uniting the disk to caps at the time of the assembly of the disks with the caps. In the drawings, Figure 1 is a diagrammatical view showing the coating of the strip.

Figure 2 is a longitudinal sectional view of a fragment of the strip.

Figure 3 is a side elevational view partly in section showing one step in the assembly operation.

Figure 4 is a view similar to Figure 3 showing the spot as it is cut and adhesively united to the cap at the time of assembly.

Figure 5 is an interior face view of the completed cap.

Figure 6 is a cross-sectional view of the cap shown in Figure 5 showing the use of additional pressure means which may be utilized following the action of the punch as illustrated in Figures 3 and 4.

Figure 7:
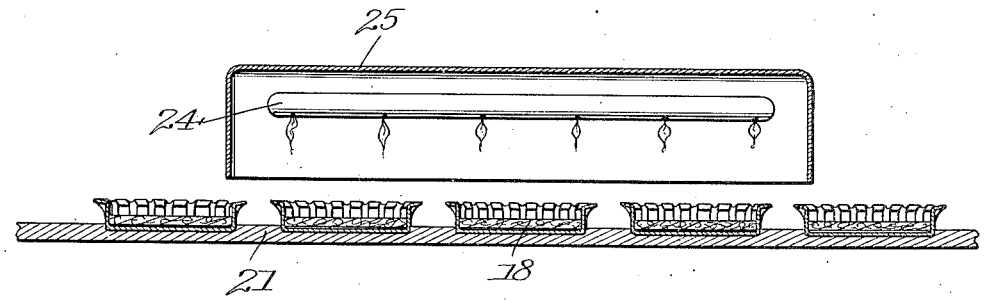
Figure 7 illustrates a suitable means for applying heat to the sealing pads or disks for preheating the assembled crowns which are fed to the punch whereby to effect adhesion of the center spot as soon as it is deposited.

The strip of facing material should have the characteristic of aluminum foil. That is to say, it should present one surface which is non-absorbent and gas impervious. This strip may be fed from a reel 10 to a reel 11, suitably separated so that the adhesive coating may be applied and hardened between the time any portion of the strip leaves the reel 10 and is wound upon the reel 11. For the purpose of applying the adhesive, the same may be maintained in a trough 12, positioned beneath an adhesive applying roll 13, between which and a roll 14, the strip passes, so that as the rolls are rotated the adhesive is applied to the undersurface thereof. As will be understood, the adhesive hardens between the time it is applied and the winding of the laminated strip upon the reel 11.

The completed spot material or liner is illustrated in Figure 2, and comprises the layer 15 of non-absorbent and gas impervious material, such as aluminum foil, having on one surface the coating 16 of adhesive, which is preferably of the thermoplastic character hereinbefore described. This adhesive is waterproof or liquid resistant, and will be normally hard, i. e., non-tacky, at room temperature, so that the material may be conveniently handled in strip form, but quickly softens under the application of heat, becoming tacky, so that upon the application of pressure, the laminated disk will be adhesively retained in the cap. The preferred method of applying the material to the cap is to utilize, at the time of assembly, both heat and pressure to unite the spot to the cork or cushion material insert or facing of the cap.

In Figures 3 and 4, there is shown a suitable mechanism for applying the disk and adhesively uniting it to the cork insert at the time the disk is punched from the strip.

The cap 17 is of the conventional crown type having an interior facing 18 of cushion material, such as composition cork retained in the cap as by an adhesive layer 17'; the cushion disk and adhesive may be applied to the cap in any suitable manner, for example, as described in the patent to Marsa, No. 1,603,786, granted October 19, 1926. The caps, with the cushion disks or pads inserted therein, may be positioned beneath the cutting dies 19, 20, by means of a traveling bed 21 having suitable sockets for receiving the cap so as to position the same accurately beneath the cutting dies. The strip material for forming the spot is fed beneath the die 20 with the adhesive coating 16 facing the cap, and when the die descends it will cut from the strip, which is fed by any suitable means (not shown), a spot or facing 22 of the character illustrated in Figures 5 and 6. The spot or disk is preferably of smaller diameter than the cap facing so as to form a substantially centrally disposed spot which leaves around its edge an exposed portion of the cushion material adapted to engage the edge of a bottle neck, the spot being of sufficient size to close the bottle mouth and prevent contact of the contents with the cushion material.

As will be observed (Figures 3 and 4) as the punch 20 descends, it cuts from the strip a spot of the size shown in Figure 5, and continued downward movement presses this disk upon the cushion layer 18. As hereinafter described, the method contemplates a preheating of the assembled crown, i. e., the metal shell with a sealing pad therein, before the spot is deposited so that the spot will adhere to the pad as soon as it is deposited.

The punch 20 may, if desired, be maintained at an elevated temperature, as by means of a burner 23, and the temperature should be sufficient to fuse or soften the adhesive coating and make it tacky so that, at the time the disk is assembled with the cap, the heat and pressure will cause the disk to be adhesively united to the surface of the cushion material with sufficient permanency to insure that the position will be retained and avoid likelihood of displacement of the disk thereafter.

As hereinbefore stated, after the spot is positioned on the sealing pad heat and pressure may be applied, as by a plunger or a plunger and heated table. In Figure 6 there is shown for this purpose a carrier $i$ and a spring-pressed plunger $j$. The plunger $j$ is heated by gas jets, and thus the plunger serves as means for applying a continuing heat and pressure after the punching operation to ensure complete fusion of the adhesive and a close adhesion of every portion of the disk 15 to the disk 18.

Figure 8:
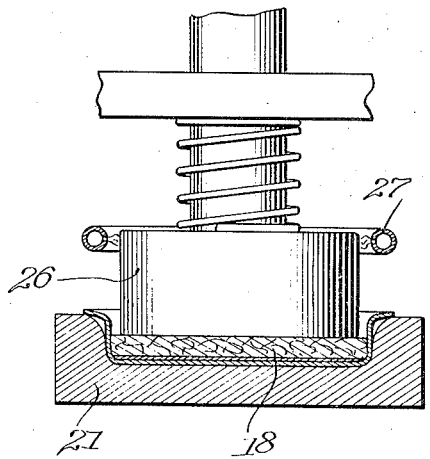
Figure 8 is a view illustrating another mechanism suitable for preheating.

It may be desirable to secure the spot in position, prior to the heat and pressure steps, sufficiently to prevent dislodgment of the spot during any interval between assembling and final sticking. This may be accomplished, for example, by preheating the assembled crown i. e., metal shell with the sealing pad or disk therein, to soften the coating as soon as the metal foil spot is deposited. The coating thus becomes tacky enough, as soon as deposited on the sealing pad, to hold the metal foil spot from getting out of position during ordinary passage through assembling apparatus. In Figure 7, there is illustrated a suitable means for preheating the sealing pads to ensure adherence of the spot as soon as deposited. A burner 24 is positioned over the conveyor 21 and spaced sufficiently therefrom to apply to the pads heat sufficient to cause the spots to adhere to the latter as soon as deposited. This burner may be disposed within a hood 25 which confines the heat and tends to direct the same against the pads. As will be understood, it is sufficiently elongated to create sufficient heat for the purpose desired. This heater may be positioned immediately in advance of the punch 20 so that heat is not appreciably dissipated or lost before the punching operation. In Figure 8 there is illustrated another mechanism which may be used for preheating. A plunger 26 maintained at an elevated temperature, as by a gas burner 27, when positioned immediately in advance of the punch may be utilized to raise the temperature of the pads sufficiently to cause the spot to adhere to the pads as soon as deposited thereon.

The assembled unit is then cooled and the cooling may advantageously be coupled with pressure, for example, by a plunger such as illustrated in Figure 6, but which would not, of course, be heated. Cooling may be effected in any suitable manner, being carried out to the congealing point of the coating material.

The resulting crown has a firmly secured metal foil spot which is not liable to become loose in use, owing to the fact that the adhesive substance is not soluble in liquids more commonly sealed by crown corks. Moreover, when the metal foil is assembled with the sealing disk, it is already prepared for being stuck in place, the sticking being accomplished by the simple application of heat and pressure. The coating operation is a simple one and the coated metal foil is easily handled because the dry coating is not tacky.

A cap made in accordance with this method possesses the advantage of a substantially uniform and complete distribution of the adhesive layer throughout each spot or facing disk. The method has the advantage of eliminating the labor of associating a separate adhesive strip and a strip of facing material, and the further advantage of enabling higher speeds to be maintained in the facing spot applying machine. The elimination of the danger of breakage of a separate adhesive tissue strip avoids the frequent stoppage of the machine, which was unavoidable due to the handling of the somewhat fragile and elastic adhesive tissue.

I claim:

1. The method of assembling linings for sealing pads in receptacle closure caps, consisting in providing caps with sealing pads therein and a web of lining material arranged with an adhesive surface non-viscous at normal temperature, heating the pads in the caps, and severing linings from the web of lining material and assembling the linings as they are severed from the web in the caps with the adhesive surface in contact with the heated pads to render the adhesive viscous and effect adhesion of the linings to the pads.

2. The method of assembling linings for sealing pads in receptacle closure caps, consisting in providing caps with sealing pads therein and a web of lining material arranged with an adhesive surface non-viscous at normal temperature, heating the pads in the caps, severing linings from the web of lining material and assembling the linings as they are severed from the web in the caps with the adhesive surface in contact with the heated pads to render the adhesive viscous and effect adhesion of the linings to the pads, and then placing the linings in the caps under heat and pressure to effect an intimate adhesion between the linings and pads.

3. The method of assembling linings for sealing pads in receptacle closure caps, consisting in providing caps with sealing pads therein and a web of lining material arranged with an adhesive surface non-viscous at normal temperature, heating the pads in the caps, severing the linings from the web of lining material and assembling the linings as they are severed from the web in the caps with the adhesive surface in contact with the heated pads to render the adhesive viscous and effect adhesion of the linings to the pads, then placing the linings in the caps under heat and pressure to effect an intimate adhesion between the linings and pads, and then placing the linings assembled in the caps under pressure during the cooling thereof.

ALBIN H. WARTH.